United States Patent

[11] 3,630,326

| [72] | Inventor | Yukinori Kawaguchi<br>2740 Nakookoo St., Honolulu, Hawaii 96814 |
|---|---|---|
| [21] | Appl. No. | 58,397 |
| [22] | Filed | July 27, 1970 |
| [45] | Patented | Dec. 28, 1971 |

[54] ACCELERATOR AND BRAKE PEDAL COMBINATION
1 Claim, 6 Drawing Figs.

[52] U.S. Cl............................................. 192/3 S,
74/478, 74/513
[51] Int. Cl............................................. B60k 29/02
[50] Field of Search............................................. 192/3 S

[56] References Cited
UNITED STATES PATENTS

| 1,994,699 | 3/1935 | Gehbauer.................. | 192/3 S |
| 2,112,019 | 3/1938 | Gyger...................... | 192/3 S |
| 2,281,755 | 5/1942 | Dunning................... | 192/3 S |
| 2,585,474 | 2/1952 | Kramar..................... | 192/3 S |

*Primary Examiner*—Benjamin W. Wyche

ABSTRACT: A foot mounted attachment for a vehicle which replaces separate accelerator and brake pedals. With one foot in the attachment, the vehicle can be accelerated or braked, depending upon the foot position.

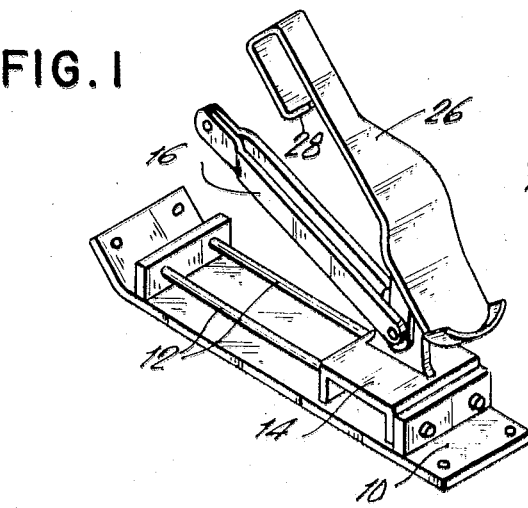
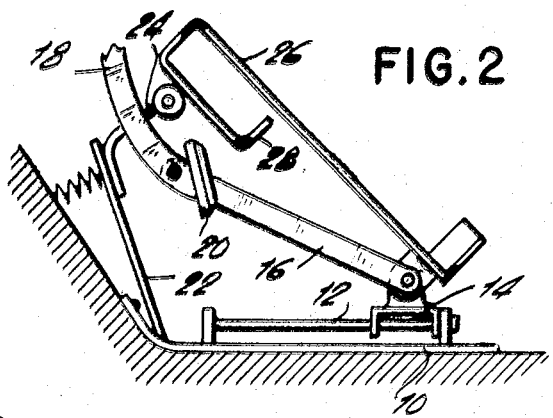
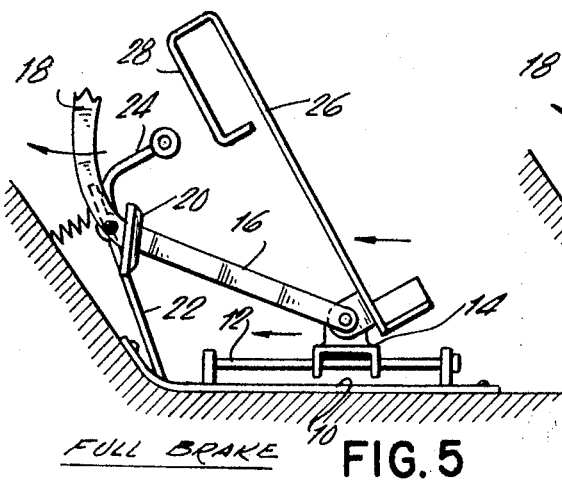
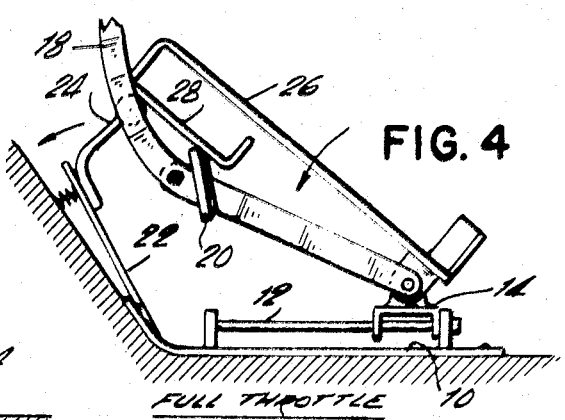
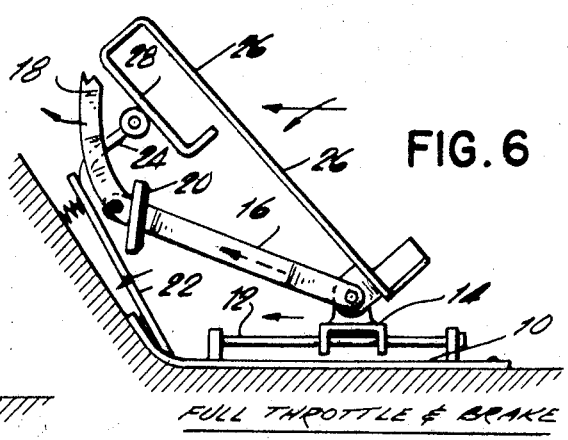

ACCELERATOR AND BRAKE PEDAL COMBINATION

SUMMARY OF THE INVENTION

In my invention, the separately disposed brake and accelerator pedals are replaced by a single unit operated by foot whereby a user can apply brake and/or accelerator without moving the foot from one pedal to another. This is accomplished by a foot receiving attachment which can be moved longitudinally forward or backward to control braking and which can be pivoted up and down about a fixed point to control acceleration.

BRIEF DESCRIPTION OF THE DRAWINGS

In the drawings:

FIG. 1 is a perspective view of the brake portion of my invention;

FIG. 2 is a side view showing both brake and accelerator portions of my invention;

FIG. 3 shows my invention with brake off and accelerator also off;

FIG. 4 shows my invention with full acceleration and no brake;

FIG. 5 shows my invention with full brake and no acceleration; and

FIG. 6 shows my invention with full brake and full acceleration.

DETAILED DESCRIPTION OF PREFERRED EMBODIMENTS

Referring now to FIGS. 1–5, secured to the floor of a vehicle in the region where brake and accelerator pedals are normally disposed is a frame 10 supporting two parallel horizontal longitudinally extending rails 12. A plate 14 has a bracket with openings through which the rails extend whereby the plate is longitudinally slidable back and forth along the rails. An elongated link 16 is pivotally secured at one end to the plate and is pivotally secured at its other end to a brake lever 18. Linkage 16 carries a pedal 20.

Disposed along side of the lever and spaced from the linkage is a spring loaded plate 22 pivotally secured at the bottom end to the vehicle floor and carrying at its other end a member 24 connected to the throttle.

An enlarged foot operated pedal 26 is pivotally secured at its bottom end to plate 14 and has an extension 28 extending at its rear to be engageable with pedal 20 and member 24 when the pedal 26 is pivoted downward. Moreover, pedal 26 can be slid longitudinally forward and backward to control braking.

Thus, any throttle position between off and full can be selected simultaneously with any brake position between off and full on by suitable foot controlled action as shown.

While I have described my invention with particular reference to the drawings, such is not to be considered as limiting its actual scope.

Having thus described this invention, what is asserted as new is:

1 A control for a brake and throttle on a vehicle comprising a conventional vehicle brake pedal and accelerator pedal, a pair of parallel and horizontal rails fixed to the vehicle, a support plate slidably mounted for longitudinal movement along said rails, a foot plate and a link pivotally connected at one of their ends to said support plate, the other end of said link connected to said brake pedal, and the other end of said foot plate operatively connected to said accelerator pedal whereby the foot plate may be simultaneously pivoted on the support plate and slid along the rails to simultaneously operate the brake and throttle in any combination of positions.

* * * * *